United States Patent
Ahad

(10) Patent No.: US 10,942,791 B2
(45) Date of Patent: Mar. 9, 2021

(54) MANAGING LOAD IN REQUEST PROCESSING ENVIRONMENTS

(71) Applicant: ORACLE INTERNATIONAL CORPORATION, Redwood Shores, CA (US)

(72) Inventor: Rafiul Ahad, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 174 days.

(21) Appl. No.: 16/132,706

(22) Filed: Sep. 17, 2018

(65) Prior Publication Data
US 2020/0089545 A1 Mar. 19, 2020

(51) Int. Cl.
G06F 15/16 (2006.01)
G06F 9/50 (2006.01)
H04L 29/08 (2006.01)
G06F 9/54 (2006.01)

(52) U.S. Cl.
CPC ............ G06F 9/5083 (2013.01); G06F 9/546 (2013.01); H04L 67/10 (2013.01); H04L 67/325 (2013.01); *G06F 2209/508* (2013.01); *G06F 2209/5022* (2013.01)

(58) Field of Classification Search
CPC ....... G06F 9/5083; G06F 9/546; H04L 67/10; H04L 67/325
USPC ........................... 709/223; 707/608; 718/105
See application file for complete search history.

(56) References Cited

U.S. PATENT DOCUMENTS

| | | | |
|---|---|---|---|
| 8,190,740 B2 | 5/2012 | Stienhans et al. | |
| 8,958,293 B1 | 2/2015 | Anderson | |
| 9,304,814 B2 * | 4/2016 | Li | H04L 63/102 |
| 9,826,035 B2 | 11/2017 | Genevski et al. | |
| 9,930,067 B1 * | 3/2018 | Johansson | H04L 63/166 |
| 2004/0264501 A1 * | 12/2004 | Zalitzky | H04L 47/11 370/468 |
| 2011/0161980 A1 * | 6/2011 | English | H04L 43/08 718/105 |
| 2012/0030326 A1 * | 2/2012 | Cassidy | H04N 21/64738 709/223 |
| 2014/0038546 A1 * | 2/2014 | Neal | H04M 17/10 455/405 |
| 2014/0075239 A1 | 3/2014 | Prathipati et al. | |
| 2014/0122725 A1 | 5/2014 | Batrouni et al. | |
| 2014/0153422 A1 * | 6/2014 | Nambiar | H04L 61/25 370/252 |

(Continued)

*Primary Examiner* — Douglas B Blair
(74) *Attorney, Agent, or Firm* — Kraguljac Law Group, LLC

(57) ABSTRACT

Systems, methods, and other embodiments that manage load in request processing environments are described. In one embodiment, a method includes receiving, at a backend of a request processing environment, requests transmitted by frontends. The backend is controlled to process the requests to create responses that are transmitted back to the frontends. Load of the backend processing the requests is monitored. In response to the load exceeding a threshold, a retry interval is calculated as a function of the load. In response to receiving a subsequent request from a frontend, a command is transmitted to the frontend. The command modifies operation of the frontend to wait the retry interval before re-transmitting the subsequent request as a retry request and to avoid generating an error message.

16 Claims, 11 Drawing Sheets

(56) References Cited

U.S. PATENT DOCUMENTS

| | | | |
|---|---|---|---|
| 2015/0032686 A1* | 1/2015 | Kuchoor | G06F 3/0481 |
| | | | 707/608 |
| 2017/0063989 A1* | 3/2017 | Langouev | G06F 9/5083 |
| 2018/0077236 A1* | 3/2018 | Niikura | G06F 3/061 |
| 2019/0386683 A1* | 12/2019 | Danilov | H03M 13/616 |

* cited by examiner

MANAGING LOAD IN REQUEST PROCESSING ENVIRONMENTS

BACKGROUND

A basic request processing environment comprises one or more frontends or threads (henceforth referred to as frontends), and one backend that comprises one or more backend processes or threads (servers). Each frontend is running on a machine or device that is different from the machines in the backend. One embodiment of a frontend is a browser. Another embodiment of a frontend is a client API used to access services provided by the backend. A user or a computer program uses a frontend to access services provided by the request processing environment. The backend may instruct frontends to do certain tasks. In one example, a basic request processing environment serves a microservice. The microservice may depend on services provided by other microservices. A general request processing system is a network of multiple basic request processing systems whereby one backend may also be a frontend for another backend that provides services needed by the backend. In this type of request processing system, the frontends are considered part of the request processing system.

In one example, a request processing environment has a backend of one or more backend processes running on one or more backend computers. The backend processes requests received from frontends, such as requests to execute services or other functionality. In particular, the backend computers process requests from the frontends. For example, a frontend such as a browser transmits a request to access an email service hosted by the request processing environment. The request is routed to a backend computer that executes the email service in order to provide the frontend with access to the email service. If the request processing environment becomes overloaded, then requests will be rejected. This could cause the frontend to provide an error message to a user that the email service is currently unavailable and that the user should try again later.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that provide for managing load in a request processing environment that processes requests from frontends. The present system manages load, such as load spike, by instructing frontends to wait a retry interval before retrying a request when load of the request processing environment exceeds a threshold. In one embodiment, for request processing systems catering to a finite set of users, the present system implements a model where agents (frontends) used by each user is considered part of the model rather than considering only conditions of a server. During load spikes, the server may queue only a few requests and instruct the agents to retry the remaining requests after a certain interval of time rather than generating an error message. The user thus does not see errors, which is a better user experience.

In one embodiment, the retry interval is dynamically calculated based upon various factors relating to a current load of the request processing environment, frontends will be instructed to wait time intervals based on the retry intervals that are not arbitrary or random. Otherwise as in prior processes, arbitrary or randomly calculated retry intervals can result in frontends waiting longer than necessary to retry requests. This increases latency experienced by the frontends. Arbitrarily or randomly calculated retry intervals can also result in frontends not waiting long enough for the request processing environment to be able to process subsequent requests. This will cause the frontends to wait and try yet again, which can also increase latency.

Accordingly, the present system improves existing retry mechanisms by calculating more precise and relevant retry intervals based upon the factors relating to load. The present system also improves the client-side frontend experience by instructing a frontend to wait the retry interval and to avoid generating an error message. In this way, the frontend and backend collaborate to provide an improved client-side frontend experience by not generating errors messages when a request is not processed and will be retried after the retry interval.

Figure 1:
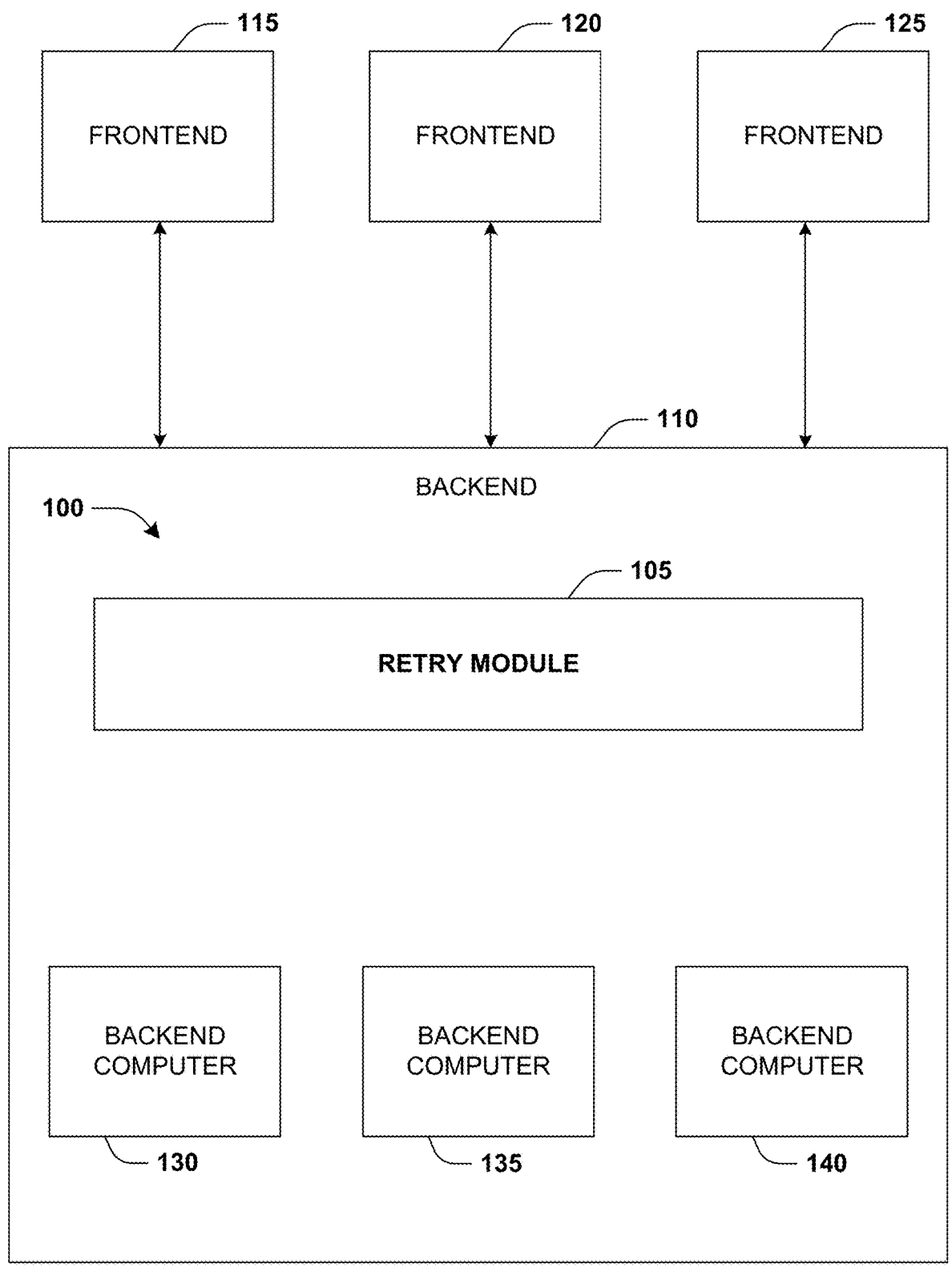
FIG. 1 illustrates an embodiment of a system associated with managing load in request processing environments.

With reference to FIG. 1, one embodiment of a system 100 is illustrated that is configured to manage load in a request processing environment that processes requests from frontends. A more detailed description is provided with reference to FIG. 2. The system 100 includes a retry module 105. The retry module 105 is part of a backend 110 of the request processing environment. The backend 110 comprises one or more backend computers (e.g., backend computers 130, 135, 140) configured to process requests received from one or more frontends (e.g., frontends 115, 120, 125). For example, the backend computer 130 may execute a service requested by the frontend 115. In this way, the frontend 115 is provided with access to the executing service.

The retry module 105 is configured to monitor load of the backend 110 processing requests received from the frontends. In one embodiment of monitoring load, requests are queued into a queue before being processed by backend computers. In one embodiment, the load is monitored by determining how full the queue of pending requests is at any point in time. In another embodiment, the load is monitored by determining an amount of time that pending requests remain within the queue before being processed by backend computers. Various other techniques for monitoring load can be used.

The retry module 105 is configured to determine if the load exceeds a threshold. The threshold may correspond to a fullness of the queue, an amount of time that requests remain in the queue before being processed, etc. Upon determining that the load exceeds the threshold, the retry module 105 calculates a retry interval as a function of a current load of the request processing environment. The retry interval may be dynamically calculated each time a request is received while the load exceeds the threshold. In one embodiment, the retry interval is a time interval $t_f$ and is calculated as: $t_f \geq (u*t_s/s)-(t_q+t_s+t_t)$. u is a number of frontends connected to the backend 110 of the request processing environment. $t_s$ is an average service time for the backend process running on backend computer to process requests. s is a number of backend processes that are processing requests. $t_q$ is a queued time corresponding to an amount of time that requests are queued before being processed by the backend. $t_t$ is a think time corresponding to a time between a frontend receiving a response to a request and subsequently transmitting a next request to the backend. In this way, the retry module 105 calculates a more relevant and precise retry interval than if the retry interval is arbitrarily or randomly chosen.

When a subsequent request is received from a frontend while the load exceeds the threshold, the retry module 105 determines that the subsequent request will not be processed. Accordingly, the retry module 105 constructs a command as a response to the subsequent request. The command comprises an instruction for the frontend to wait a time interval specified by the retry interval before re-transmitting the subsequent request as a retry request. The command informs the frontend that the request was not processed. The command also instructs the frontend to refrain from generating an error message that the request was not processed.

Instructing frontends to wait retry intervals that are directly related to load factors of the backend 110 will result in frontends waiting more precise and optimal times before retrying requests. This will improve latency otherwise experienced if the frontends merely waited arbitrary or random retry intervals. Waiting arbitrary or random retry intervals could result in frontends waiting longer than necessary or not waiting long enough and having to wait yet again. Furthermore, the retry module 105 improves operation of the backend 110 by managing what requests are processed by the backend computers and what requests are rejected to be retried after the retry interval. Managing requests will help ensure that backend computers do not become overburdened by load spikes. Managing requests by dynamically calculating retry intervals based upon current load will also help ensure that requests will be retried at intervals where load is more likely to be lower. In this way, the operation of frontends and the backend computers is improved by determine optimal times to wait to retry requests.

Figure 2:
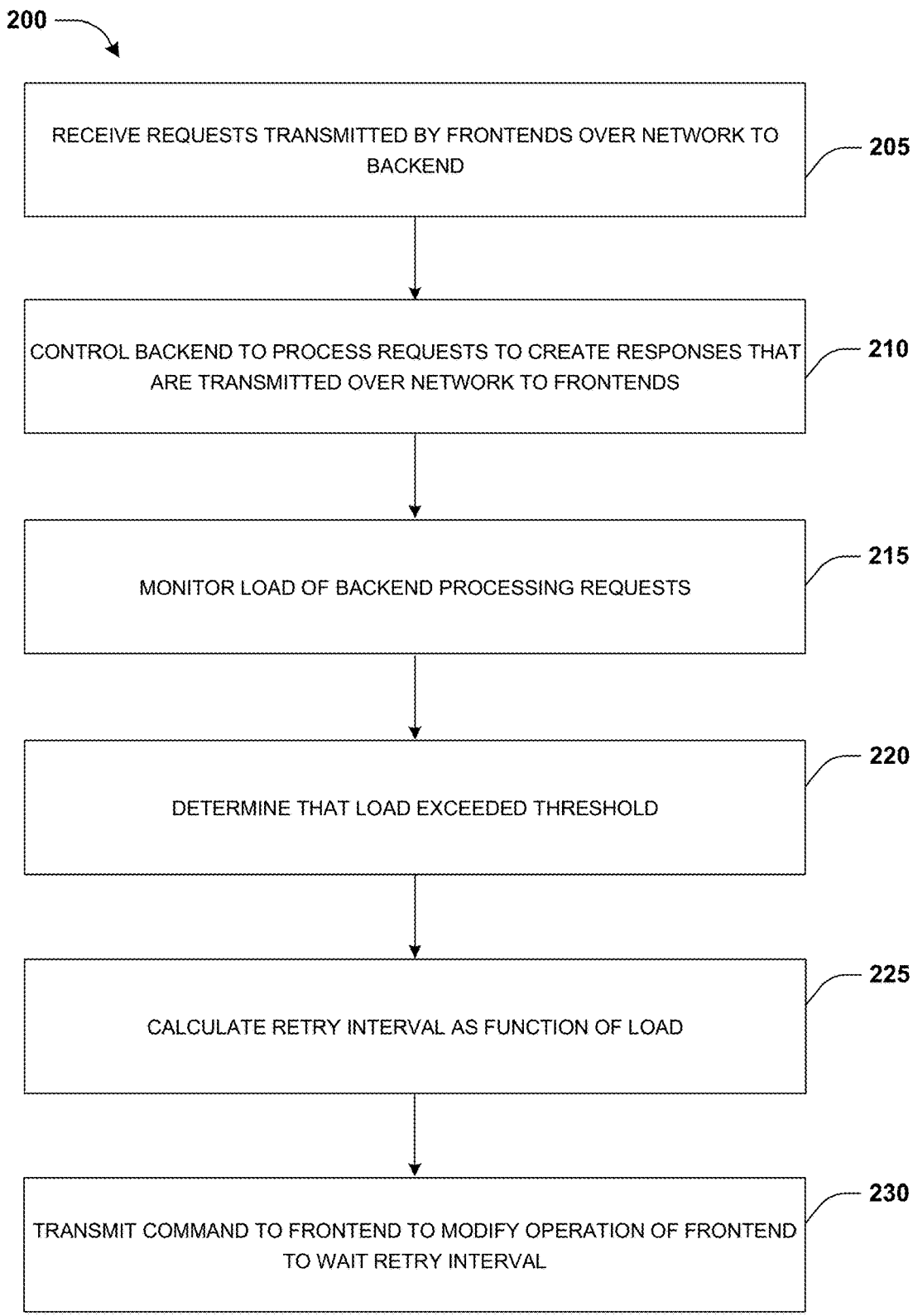
FIG. 2 illustrates an embodiment of a method associated managing load in request processing environments.

With reference to FIG. 2, one embodiment of a computer implemented method 200 that manages load in a request processing environment that processes requests from frontends is illustrated. In one embodiment, the method 200 is performed by the retry module 105 and system 300 of FIGS. 3A-3E utilizing various computing resources of a computer that is configured as a special purpose machine to implement the disclosed features in one or more combinations, and/or other computers similarly configured. The computing resources, such as a processor, are used for executing instructions associated with calculating a retry interval. Memory and/or disks are used for storing instructions that are executed by the retry module 105 to calculate the retry interval and transmit commands to frontends over a network. A network is used for receiving requests from frontends and transmitting commands to the frontends over the network. The method 200 is triggered upon a backend 305 of the request processing environment receiving requests from frontend.

The backend 305 of the request processing environment comprises one or more backend computers, such as a first backend computer 330 and a second backend computer 335. The backend computers are configured to process requests received from frontends, such as a first frontend 310, a second frontend 315, and a third frontend 320. A frontend machine may comprise a computer, a laptop, a mobile device, a wearable device, etc. A frontend machine may host a frontend, such as an application, a browser, a client library such as a database application programming interface (API) library, a representation state transfer (REST) API endpoint, an API gateway, etc. In one example, the first frontend 310 comprises a remote client computer executing a calendar application as the frontend. The calendar application is configured to connect to and access a calendar service that is hosted by the backend 305. In this way, the calendar application transmits requests to the backend 305 for access to calendar data provided by the calendar service. The first backend computer 330 may execute the calendar service to provide the calendar application with access to the calendar data.

In one embodiment, the request processing environment is a multi-tenant environment, such as a cloud computing environment. The multi-tenant environment is a collection of physical and virtual infrastructure hardware and software used to execute services. A variety of different types of services can be hosted, such as software as a service (SaaS), network storage, an email service, application hosting services, a financial accounting service, an inventory tracking service, etc. These services can be remotely access over a network by the frontends. A frontend can be associated with a tenant having an account with the multi-tenant environment for executing services by backend processes of the backend 305. For example, a tenant using the frontend 310 can subscribe to and access the calendar service through an account with the multi-tenant environment.

At 205, the backend 305 receives requests transmitted by frontends over the network to the backend 305. In one embodiment, the backend 305 comprises a network device with an address, such as an IP address. A frontend can establish a connection with the request processing environment using the IP address. In this way, the frontend can transmit requests to the request processing environment by sending data packets to the address of the network device. A request corresponds to information related to a frontend accessing a service hosted by the request processing environment. In one embodiment, the first frontend 310 transmits a request 340 for updated calendar data from the calendar service executing on the first backend computer 330.

At 210, the backend 305 is controlled to process the requests to create responses that are transmitted over the network to the frontends that sent the requests. As requests are received at the backend 305, the requests are either directly routed to a backend computer for processing or are queued until the backend process is available for processing the requests. In one embodiment, the retry module 105 maintains a queue 325. As requests are received, the retry module 105 inserts the requests within the queue 325. As backend computers become available for processing the requests, requests are de-queued from the queue 325 and processed by corresponding backend computers. In this way, the queue 325 is used to slow the arrival rate of requests received at the backend for processing.

Figure 3A:
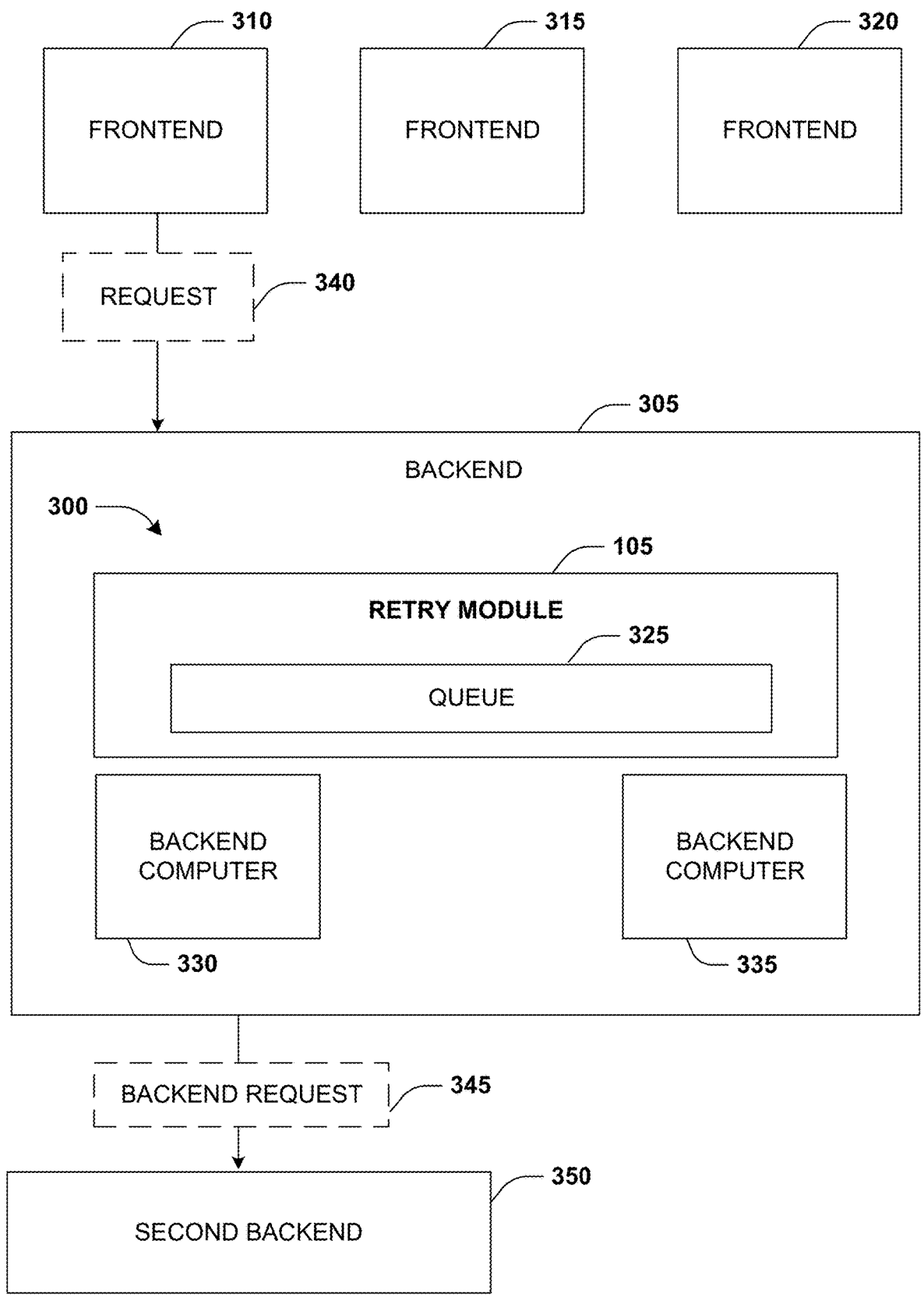
FIG. 3A illustrates an embodiment of a system associated with managing load in request processing environments, where a request is received by a backend.
Figure 3B:
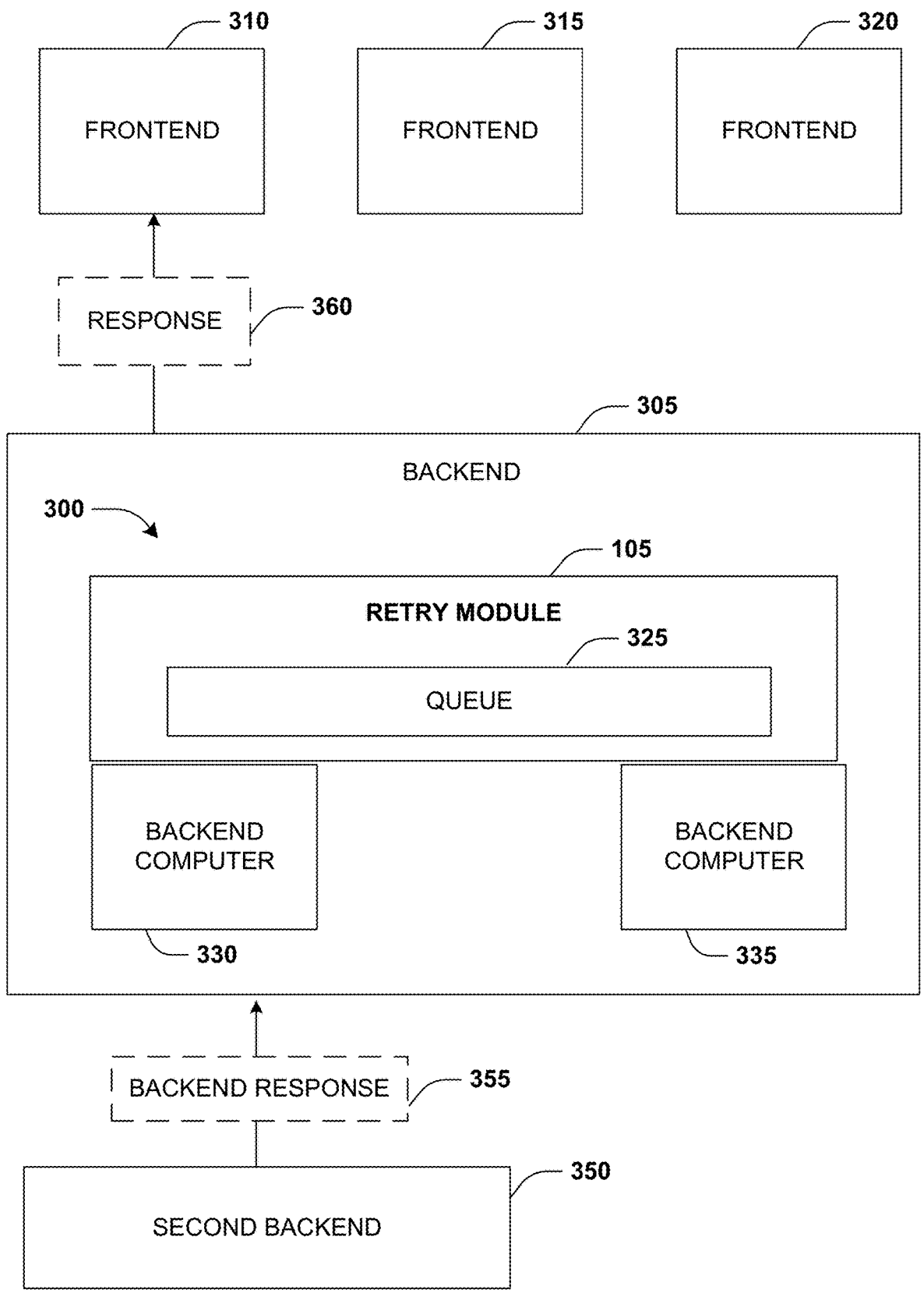
FIG. 3B illustrates an embodiment of a system associated with managing load in request processing environments, where a request is processed by a backend.

In one embodiment, the request 340 is queued by the retry module 105 into the queue 325. Upon the first backend computer 330 becoming available for processing the request 340, the request 340 is de-queued and routed to the first backend computer 330 for processing. In one embodiment, the first backend computer 330 may execute the calendar service through a virtual machine in order to process the request 340. The calendar service processes the request 340 for the updated calendar data. In one embodiment, the calendar service relies upon a data storage service executing on a second backend 350. The calendar service transmits a backend request 345 to the second backend 350 for the updated calendar data stored by the data storage service. Upon receiving the update calendar data from the data storage service through a backend response 355, the calendar service creates a response 360, as illustrated in FIG. 3B. The response 360 may comprise the updated calendar data in a format that can be displayed by the calendar application executing on the first frontend 310. The backend 305 transmits the response 360 over the network to the first frontend 310.

At 215, load of the backend 305 processing requests is monitored. The load is monitored to determine whether the load exceeds a threshold. Various techniques can be used for monitoring load. In one embodiment, fullness of the queue 325 is monitored. That is, the queue 325 may be sized to hold a certain number of requests before becoming full. In response to the queue 325 becoming a threshold amount full, a load value is set to indicate that load of the backend 305 exceeds the threshold. In another embodiment, a queue wait time (a queued time) of requests queued into the queue 325 is monitored. The queue wait time corresponds to an amount of time a request is held within the queue 325 before being processed. In response to the queue wait time exceeding a wait threshold, the load value is set to indicate that the load exceeds the threshold.

At 220, the load is determined to have exceeded the threshold. In response to the load exceeding the threshold, the retry module 105 will determine that subsequently received requests will not be processed until the load does not exceed the threshold. In one embodiment, the retry module 105 can modify a queued time based upon the load exceeding the threshold. The queued time corresponds to an amount of time that requests are queued before being routed to a backend process for processing. Modifying the queue time may help reduce the load.

Instead of merely responding with an error message that the subsequent requests cannot be processed, the retry module 105 instructs the frontends to wait a retry interval before re-transmitting the subsequent requests as retry requests. The retry module 105 also instructs the frontends to avoid generating an error message, such as an error notification to a user that the calendar service is unavailable. Instead, the frontends are instructed to wait the retry interval, and then retry the subsequent requests.

Figure 3C:
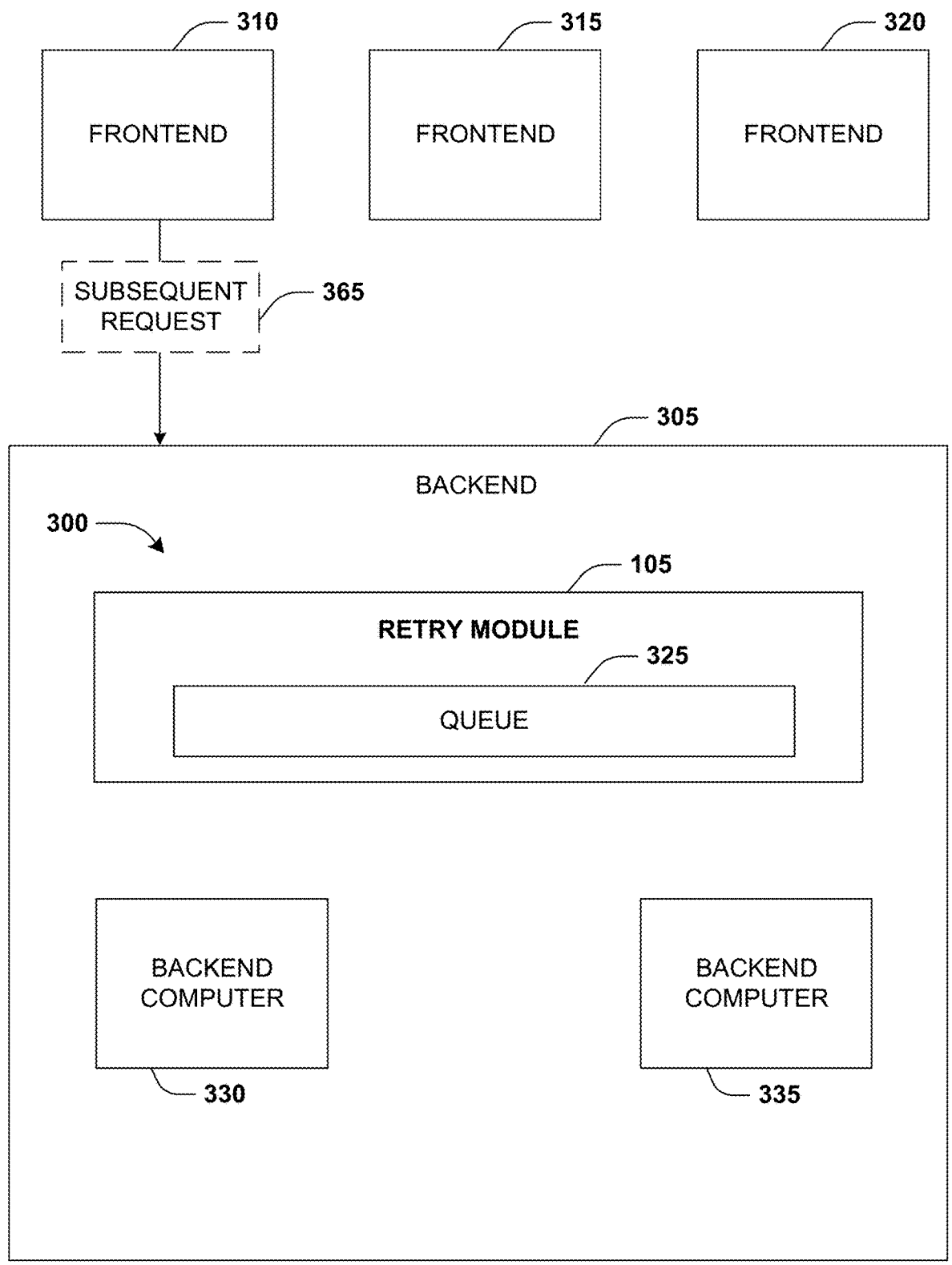
FIG. 3C illustrates an embodiment of a system associated with managing load in request processing environments, where a subsequent request is received.

At 225, a retry interval is calculated as a function of the load of the backend 305. The calculation of the retry interval may be dynamically performed whenever a subsequent request is received while the load exceeds the threshold. For example, the first frontend 310 may transmit a subsequent request 365 to store new calendar data through the calendar service, as illustrated by FIG. 3C. The subsequent request 365 may be received while the load exceeds the threshold, such as when the queue 325 is a threshold amount full. Accordingly, the retry interval is calculated based upon a current load of the backend 305.

In one embodiment, the retry interval $t_f$ is calculated as: $t_f(u*t_s/s)-(t_q+t_s+t_t)$. u is a number of frontends connected to the backend 305 of the request processing environment. The greater the number of frontends connected to the backend 305, the more likely the backend 305 will experience greater load because more frontends may be transmitting requests. $t_s$ is an average service time for the backend 305 to process requests. For example, the average service time corresponds to an average time for the first backend process 330 to process requests and transmit responses back to frontends. s is a number of backend processes (servers) that are processing requests. The more servers that are processing the requests, the more likely the load will be lower because more backend processes are available to process requests. $t_q$ is a queued time corresponding to an amount of time that requests are held in the queue 325 before being processed by the backend 305. $t_t$ is a think time corresponding to a time between a frontend receiving a response to a request and subsequently transmitting a next request to the backend. For example, the think time corresponds to a time between the first frontend 310 receiving the response 360 and transmitting the subsequent request 365. These parameters directly relate to the load of the backend 305 and are used to dynamically calculate a more relevant and precise retry interval at any given instance. For example, a larger retry interval may be calculated for a first subsequent request received at a first point in time than a second subsequent request received at a second point in time. This is because the formula and parameters can change at any given instance of time, such as where load is greater at the first point in time. For example, the load may be greater and the calculated retry interval may be longer because less frontends are connected to the backend 305, a backend computer fails, the queued time increases, the think time decreases, the average service time increase, etc. In this way, the retry module 105 calculates a more relevant and precise retry interval than if the retry interval was arbitrarily or randomly chosen.

In one embodiment, the frontends correspond to tenants accessing a multi-tenant environment hosted by the backend 305. For example, a tenant may correspond to a business that subscribes to storage services provided by the multi-tenant environment. Any number of computers of the business may connect to the multi-tenant environment to access the storage services. The retry module 105 may monitor a number of connections to the backend 305 by the tenants. The retry module 105 may determine that a first tenant has a threshold number of connections more to the backend 305 than a second tenant. For example, 50 more computers may be accessing a service subscribed to by the first tenant than the second tenant. Accordingly, the retry module 105 applies a weight to retry intervals calculated for the first tenant and/or the second tenant. The weight is applied so that retry intervals calculated for the first tenant are longer than retry intervals calculated for the second tenant. In this way, the first tenant does not "starve" the second tenant from accessing the service.

Figure 3D:
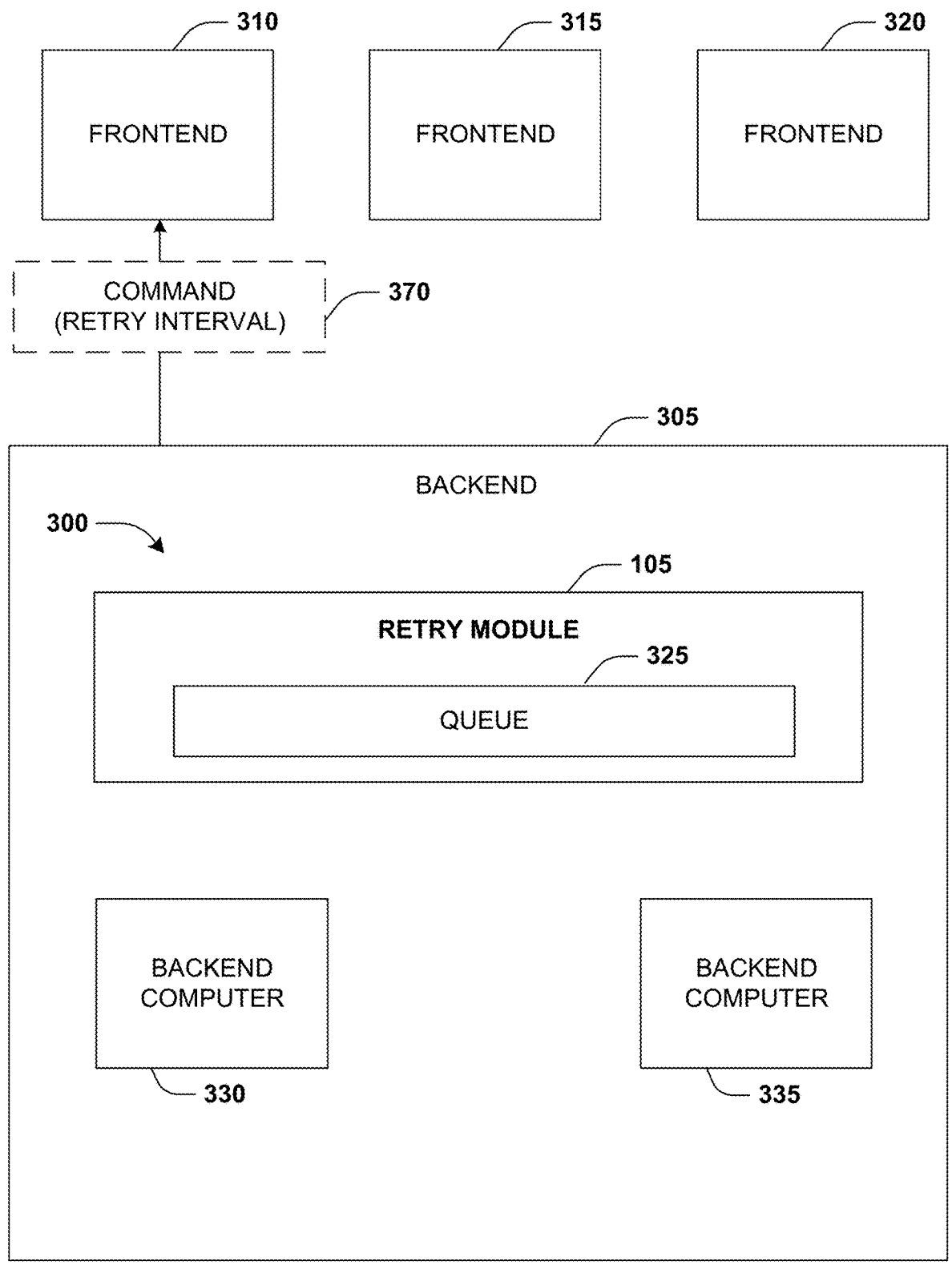
FIG. 3D illustrates an embodiment of a system associated with managing load in request processing environments, where a command with a retry interval is transmitted to a frontend.

At 230, a command 370 is constructed in response to receiving one or more subsequent requests 365 from the first frontend 310 while the load exceeds the threshold. The command 370 informs the first frontend 310 that the subsequent request 365 was not processed. The command 370 instructs the first frontend 310 to wait a time interval specified by the retry interval before re-transmitting the subsequent request 365 as a retry request. The command 370 also instructs the first frontend 310 to avoid generating an error message regarding the subsequent request 365 not being processed. The command 370 is transmitted to the first frontend 310 over the network to modify operation of the first frontend 310 to wait the retry interval, as illustrated by FIG. 3D.

In one embodiment, another subsequent request is received from the first frontend 310. The subsequent request may be received while the load still exceeds the threshold. The retry component 105 may determine that a threshold number of subsequent requests have been received from the first frontend 310 while the load exceeds the threshold. Accordingly, the retry module 105 transmits a second command to the first frontend 310. The second command instructs the first frontend 310 to route the subsequent request to a different destination, such as a different data center that hosts another instance of the request processing environment. The first frontend 310 may be instructed to try a different destination for processing the subsequent request because the load of the request processing environment has exceeded the threshold for an extended amount of time (e.g., the subsequent request has been rejected multiple times due to load exceeding the threshold), and thus the subsequent request may be processed sooner by a different destination.

In one embodiment, the retry module 105 calculates retry intervals that will be used by backends for backend communication. For example, the backend 305 and a second backend 350 communicate with one another according to a cascading configuration. The cascading configuration corresponds to where one backend relies upon output from another backend. For example, a service hosted by the backend 305 relies upon data generated by a service of the second backend 350, and the second backend 350 relies upon data generated by a service of a third backend. Thus, the backends are cascaded in terms of relying upon output from other "downstream" backends. In one embodiment, the calendar service of the backend 305 transmits requests to the data storage service host by the second backend 350. The data storage service transmits responses back to the calendar service.

Figure 3E:
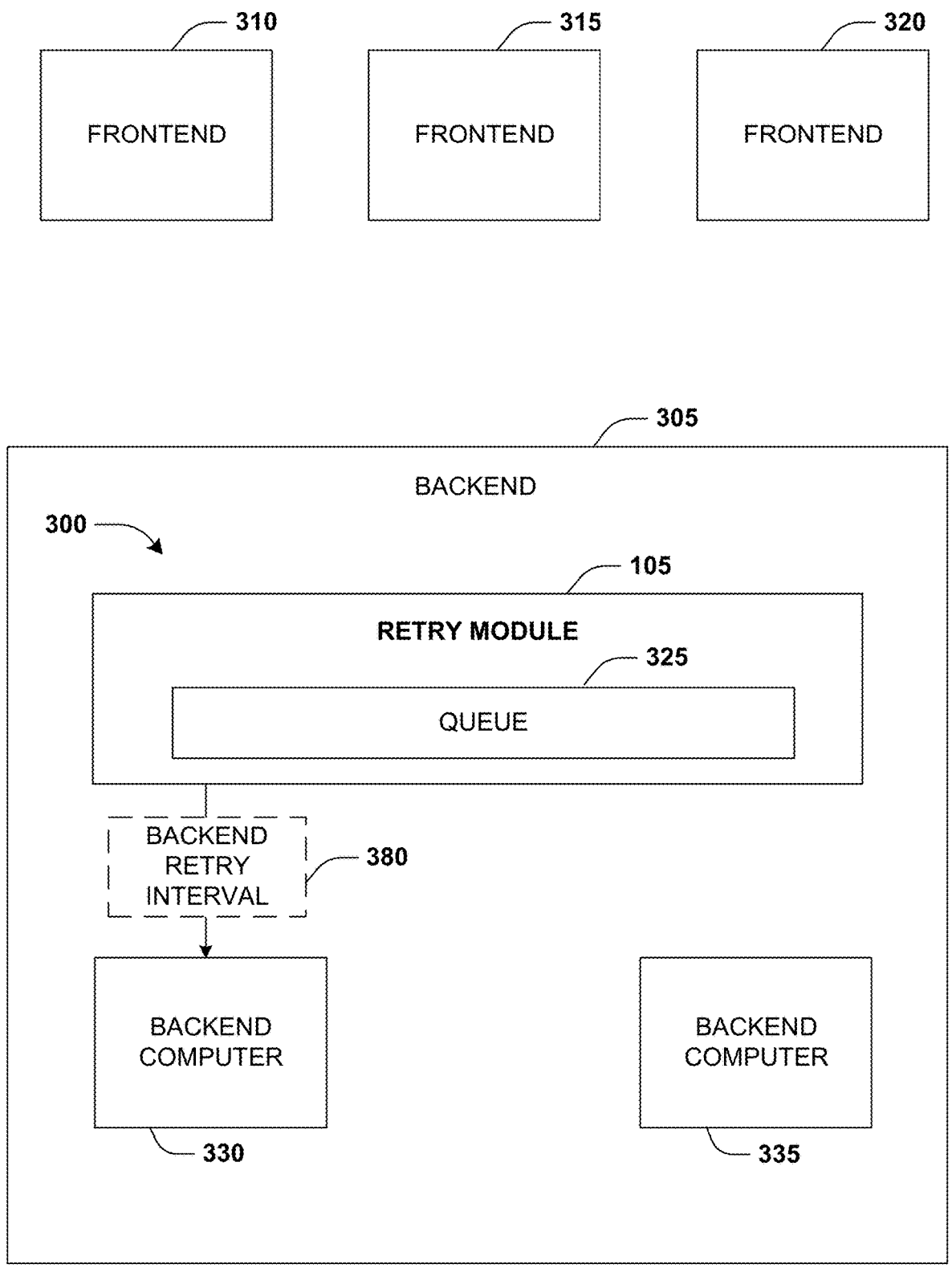
FIG. 3E illustrates an embodiment of a system associated with managing load in request processing environments, where a backend retry interval is transmitted to a backend process.

The retry module 105 monitors backend load of the backend computers. The retry module 105 may determine that backend load of the second backend 350 exceeds a backend threshold. Accordingly, the retry module 105 calculates a backend retry interval as a function of the backend load of the second backend 350. The backend retry interval may be dynamically calculated in response to the backend 305 attempting to transmit a subsequent backend request to the second backend 350 while the backend load exceeds the backend threshold. A backend command 380 is created to instruct the backend 305 to wait a time interval specified by the backend retry interval before re-transmitting the subsequent backend request as a retry backend request to the second backend 350. The backend command 380 is routed to the backend 305, as illustrated in FIG. 3E.

Instructing frontends and/or backend computers to wait retry intervals that are directly related to load factors of the backend 305 will result in frontends and/or backend computers waiting more precise and optimal times before retrying requests. This will improve latency otherwise experienced if the frontends and/or backend computers merely waiting arbitrary or random retry intervals. Waiting arbitrary or random retry intervals could result in frontends and/or backend computers waiting longer than necessary or not waiting long enough and having to wait yet again. Furthermore, the retry module 105 improves operation of the backend 305 by managing what requests are processed by the backend computers and what requests are rejected to be retried after the retry interval. Managing requests will help ensure that backend computers do not become overburdened by load spikes. Managing requests by dynamically calculating retry intervals based upon current load will also help ensure that requests will be retried at times where load is more likely to be lower. In this way, the operation of frontends and the backend computers is improved by determining more precise and optimal time intervals to wait before transmitting retry requests.

Figure 4:
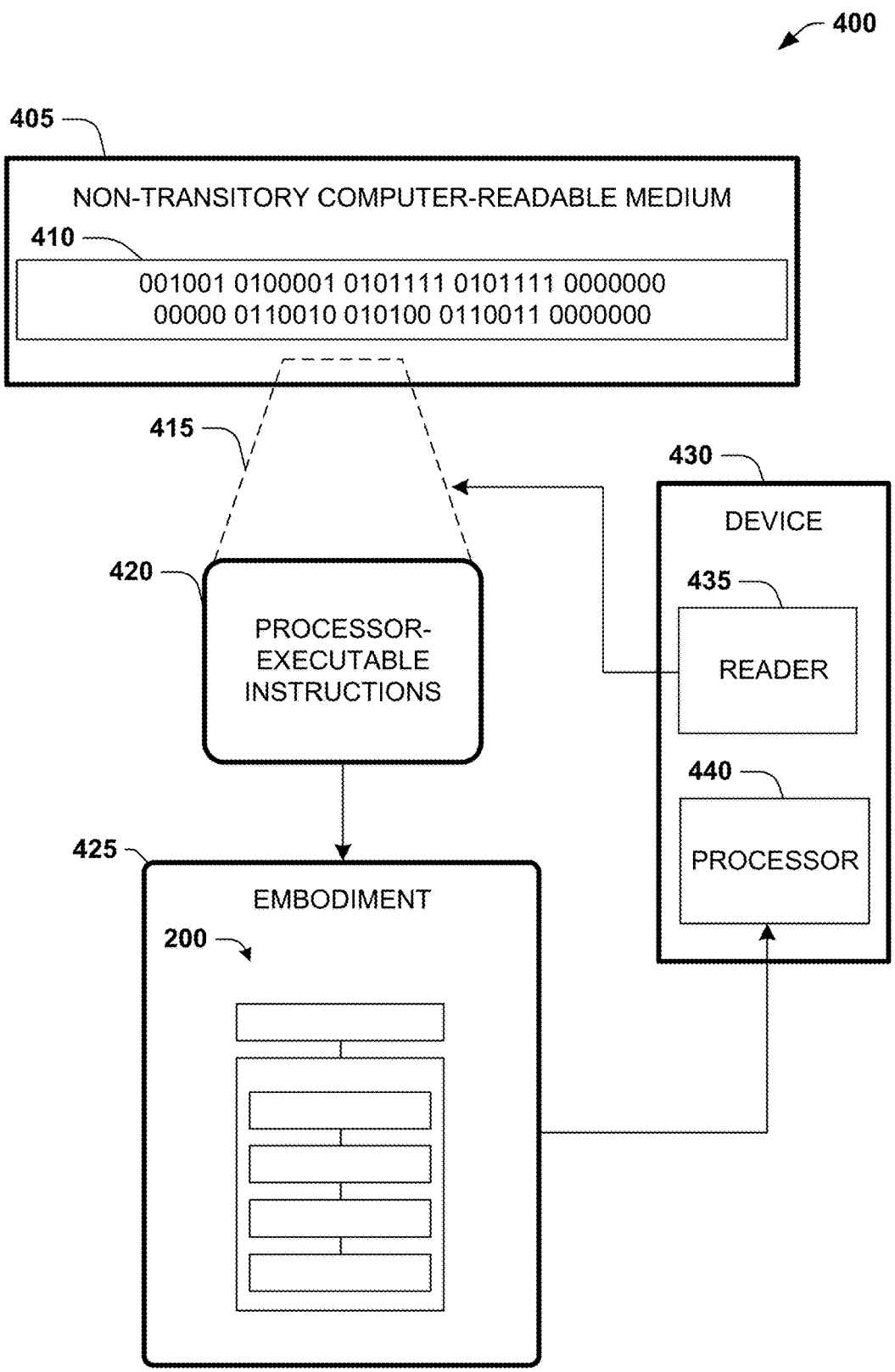
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the retry module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the functionality of the retry module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
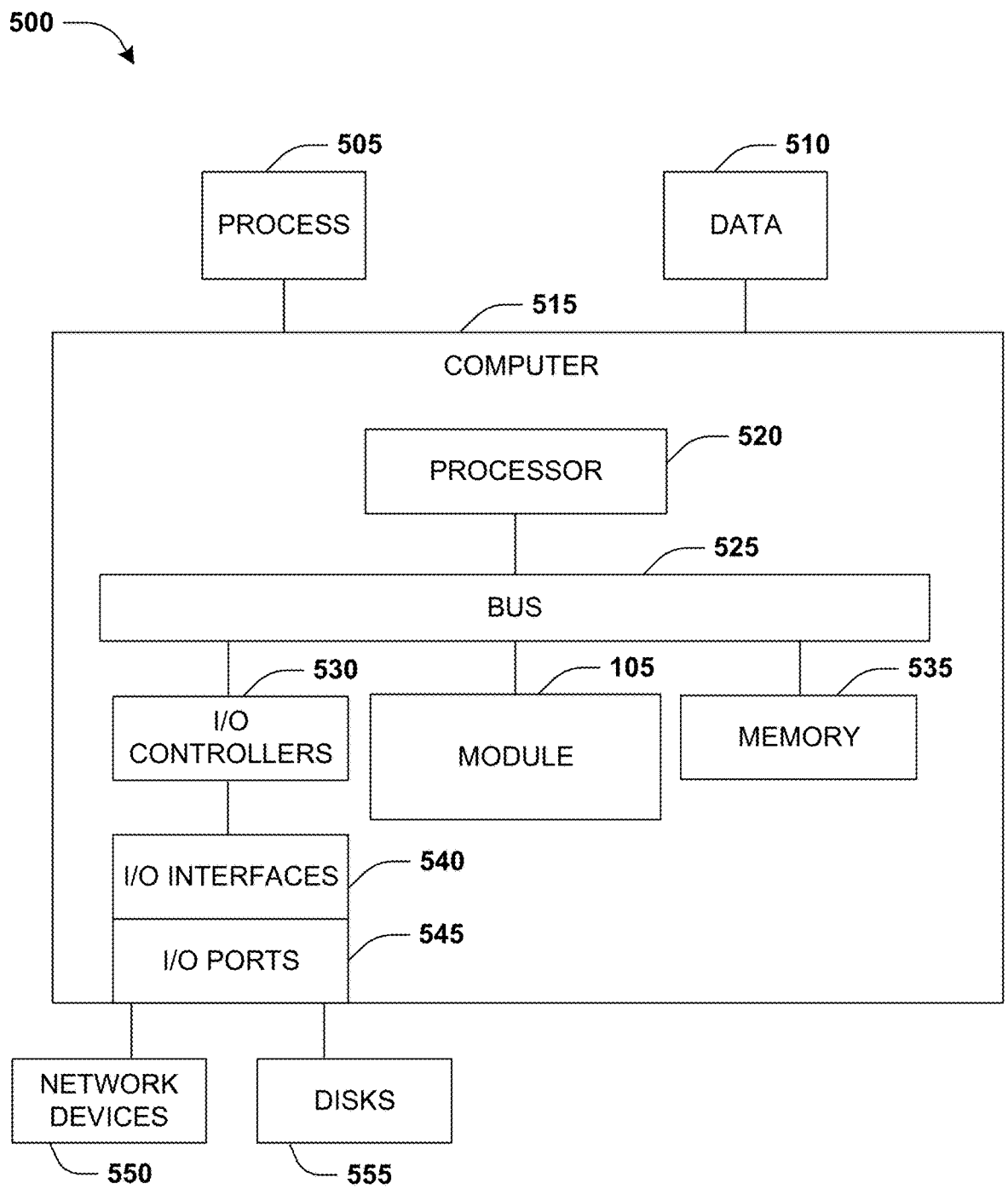
FIG. 5 illustrates an embodiment of a computing system configured with the example systems and/or methods disclosed.

FIG. 5 illustrates one embodiment of a computing system 500 that is configured and/or programmed with one or more of the example systems and methods described herein, and/or equivalents to create a special purpose computer. The computing system 500 may include at least the computer 515 that includes a hardware processor 520, a memory 535, and I/O ports 545 operably connected by a bus 525. In one embodiment, the computer 515 may include logic of the retry module 105 configured to facilitate the system 100 and/or the method 200 shown in FIGS. 1-2. In different embodiments, the logic of the retry module 105 may be implemented in hardware, a non-transitory computer-readable medium 505 with stored instructions, firmware, and/or combinations thereof. While the logic of the retry module 105 is illustrated as a hardware component attached to the bus 525, it is to be appreciated that in other embodiments, the logic of the retry module 105 could be implemented in the processor 520, stored in memory 535, or stored in disk 555.

In one embodiment, logic of the retry module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the retry module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multi-processor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with input/output (I/O) devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

Figure 6:
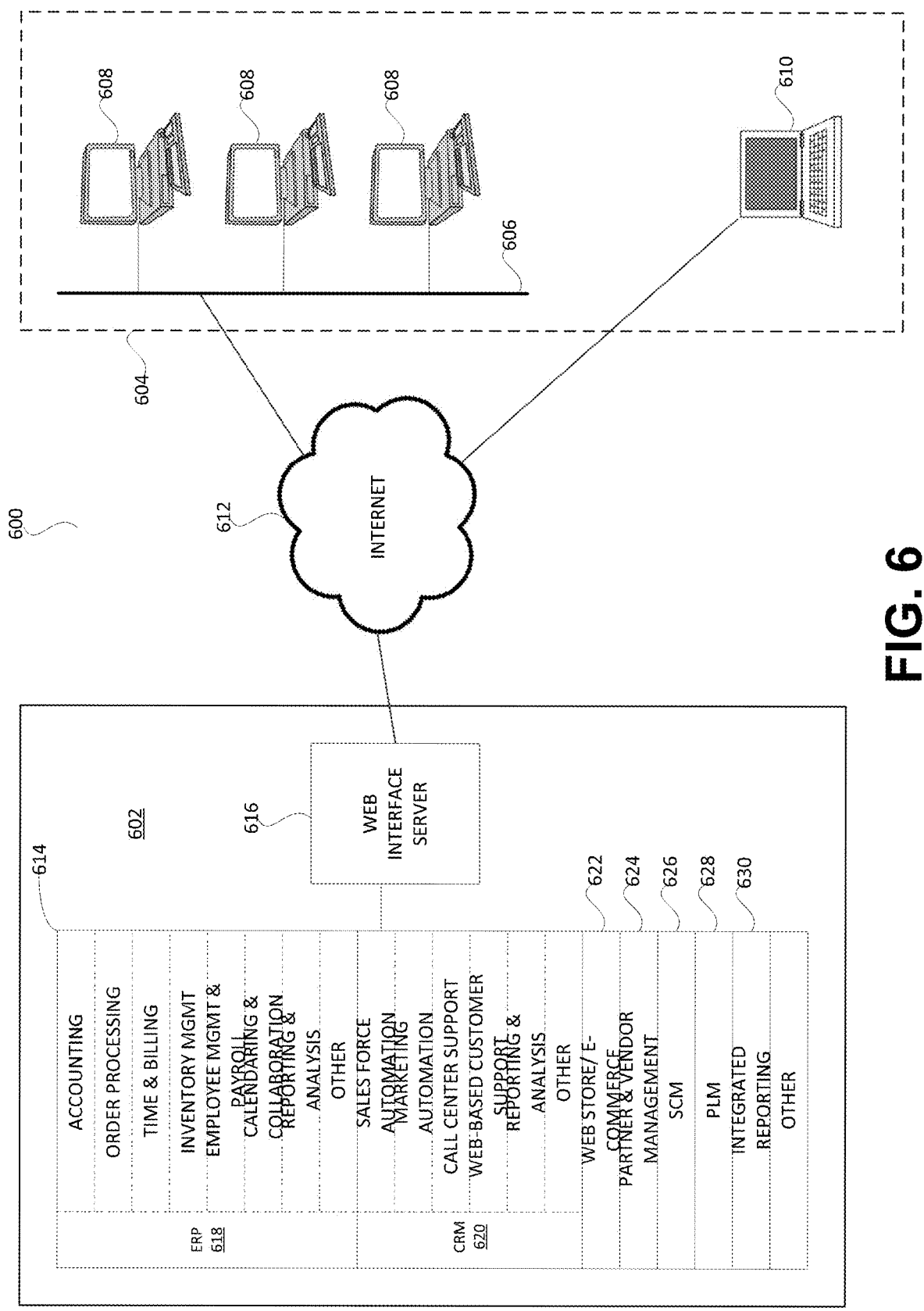
FIG. 6 illustrates an embodiment of an integrated business system and an enterprise network in which an embodiment of the present systems or methods may be implemented.

FIG. 6 is a diagram illustrating a system 600 in which an embodiment of the present system and/or methods may be implemented. Enterprise network 604 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 604 is represented by an on-site local area network 606 to which a plurality of personal computers 608 are connected, each generally dedicated to a particular end user, such as a service agent or other employee (although such dedication is not required), along with an exemplary remote user computer 610 that can be, for example, a laptop computer or tablet computer of a traveling employee having internet access through a public Wi-Fi access point, or other internet access method. The end users (consumers) associated with computers 608 and 610 may possess an internet-enabled smartphone or other electronic device (such as a PDA, tablet, laptop computer) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface server 616, coupled as shown in FIG. 6. It is to be appreciated that either or both of the integrated business server 614 and the web interface server 616 may be implemented on one or more different hardware systems and components, even though represented as singular units in FIG. 6.

In a typical example in which system 602 is operated by a third party for the benefit of multiple account owners/tenants, each of whom is operating a business, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant, but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 620 may include, but is not limited to, a sales force automation (SFA) module, a marketing automation module, a contact list module (not shown), a call center support module, a web-based customer support module, a reporting and communication module, and other CRM-related modules.

The integrated business server 614 (or multi-tenant data processing platform) further may provide other business functionalities including a web store/eCommerce module 622, a partner and vendor module 624, and an integrated reporting module 630. An SCM (supply chain management) module 626 and PLM (product lifecycle management) module 628 may also be provided. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. For example, the server comprises the computer 515 of FIG. 5. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 7:
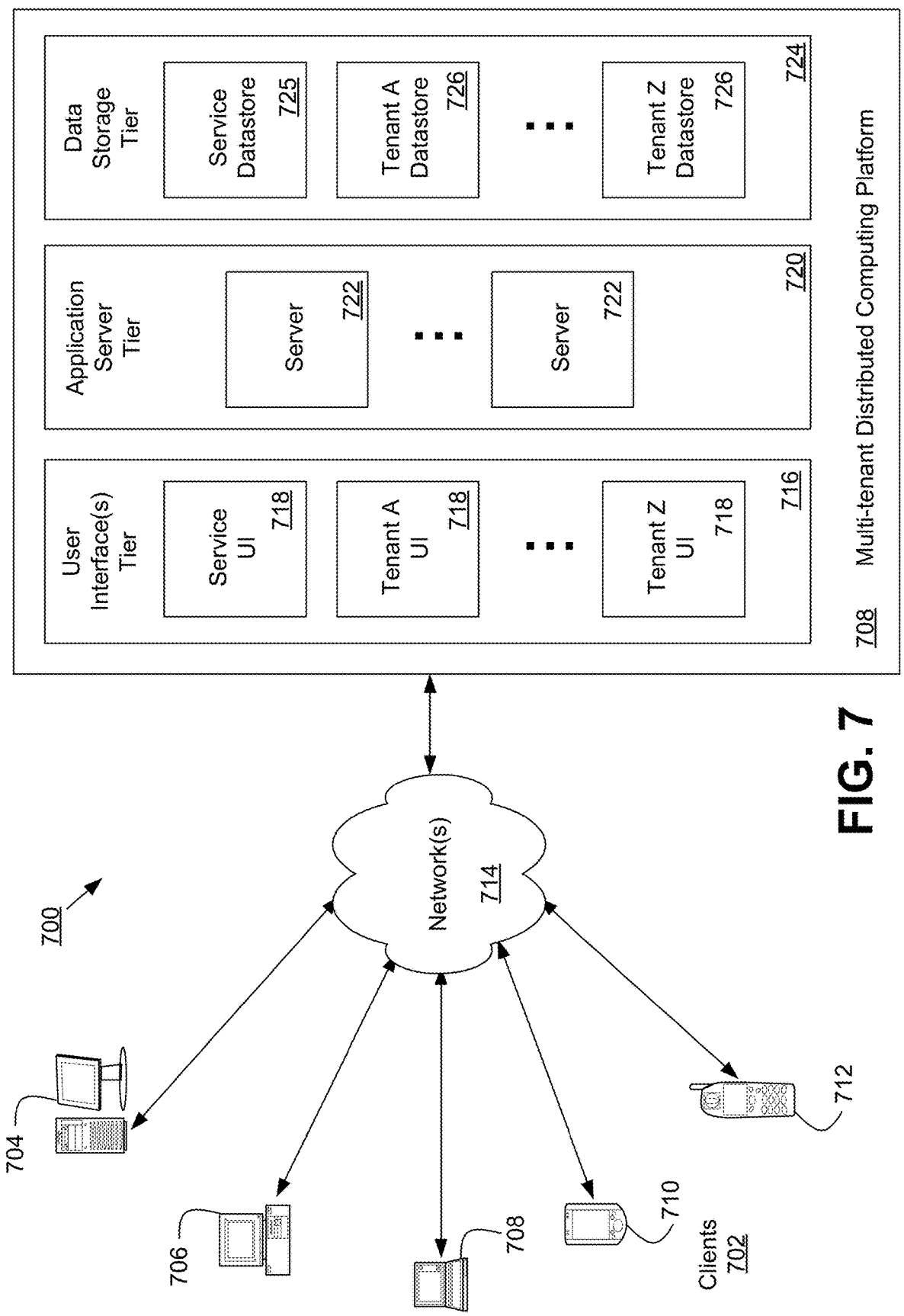
FIG. 7 illustrates an embodiment of a multi-tenant distributed computing service platform.

FIG. 7 is a diagram illustrating elements or components of an example operating environment 700 in which an embodiment of the invention may be implemented. As shown, a variety of clients 702 incorporating and/or incorporated into a variety of computing devices may communicate with a distributed computing service/platform 708 through one or more networks 714. For example, a client may incorporate and/or be incorporated into a client application (e.g., software) implemented at least in part by one or more of the computing devices.

Examples of suitable computing devices include specially programmed or configured personal computers, server computers 704, desktop computers 706, laptop computers 708, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers that are specially programmed with instructions for implemented one or more embodiments as disclosed herein. Examples of suitable networks 714 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 708 may include multiple processing tiers, including a user interface tier 716, an application server tier 720, and a data storage tier 724. The user interface tier 716 may maintain multiple user interfaces 718, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 708 may be multi-tenant and service platform 708 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 722 that are part of the platform's Application Server Tier 720. For example, the one or more servers 722 comprise the computer 515 of FIG. 5.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 708 of FIG. 7(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 722 that are part of the platform's Application Server Tier 720.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 708 of FIG. 7).

As noted with regards to FIG. 6, the integrated business system shown in FIG. 7 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computing device causes the processor to:
   receive, at a backend of a request processing environment, requests transmitted by frontends over a network to the backend;
   control the backend to process the requests to create responses that are transmitted over the network to the frontends that sent the requests;
   monitor a load of the backend processing the requests;
   in response to the load exceeding a threshold:
      calculate a retry interval as a function of the load; and
      in response to receiving a subsequent request from a frontend, transmit a command to the frontend, wherein the command modifies operation of the frontend to wait the retry interval before re-transmitting the subsequent request as a retry request and avoid generating an error message;
   wherein the instructions to calculate the retry interval comprise instructions to:
      calculate the retry interval as a function of:
         i) a number of frontends connected to the backend;
         ii) an average service time for the backend to process the requests;
         iii) a number of backend computers processing the requests;
         iv) a queued time corresponding to an amount of time that requests are queued before being processed by the backend; and
         v) a think time corresponding to a time between the frontend receiving a response to a request and subsequently transmitting a next request to the backend.

2. The non-transitory computer-readable medium of claim 1, wherein the instructions further comprise instructions to:
   construct the command to i) indicate that the subsequent request was not processed and ii) comprise an instruction to cause the frontend to refrain from generating the error message that the subsequent request was not processed.

3. The non-transitory computer-readable medium of claim 1, wherein the instructions comprise instructions to:
   insert incoming requests from the frontends into a queue, wherein the incoming requests are queued for subsequent processing by the backend; and
   in response to the queue becoming a threshold amount full, set a value to indicate that the load exceeds the threshold.

4. The non-transitory computer-readable medium of claim 1, wherein the instructions comprise instructions to:
   insert incoming requests from the frontends into a queue, wherein the incoming requests are queued for subsequent processing by the backend; and
   in response to a queue wait time of requests waiting in the queue to be processed exceeding a wait threshold, set a value to indicate that the load exceeds the threshold.

5. The non-transitory computer-readable medium of claim 1, wherein the instructions comprise instructions to:
   insert incoming requests from the frontends into a queue, wherein the incoming requests are queued for subsequent processing by the backend; and
   in response to the load exceeding the threshold, modifying a queued time corresponding to an amount of time that requests are queued before being processed by the backend.

6. The non-transitory computer-readable medium of claim 1, wherein the instructions comprise instructions to:
   prior to the command being transmitted to the frontend, construct the command to indicate that the subsequent request was not processed.

7. A non-transitory computer-readable medium storing computer-executable instructions that when executed by a processor of a computing device causes the processor to:
   receive, at a backend of a request processing environment, requests transmitted by frontends over a network to the backend;
   control the backend to process the requests to create responses that are transmitted over the network to the frontends that sent the requests;
   monitor a load of the backend processing the requests;
   in response to the load exceeding a threshold:
      calculate a retry interval as a function of the load; and
      in response to receiving a subsequent request from a frontend, transmit a command to the frontend, wherein the command modifies operation of the frontend to wait the retry interval before re-transmitting the subsequent request as a retry request and avoid generating an error message;
   wherein the instructions to calculate the retry interval comprise instructions to:
      calculate the retry interval $t_f$ as: $t_f \geq (u*t_s/s)-(t_q+t_s+t_r)$, where:
         u is a number of frontends connected to the backend;
         $t_s$ is an average service time for the backend to process the requests;
         s is a number of backend computers processing the requests;
         $t_q$ is a queued time corresponding to an amount of time that requests are queued before being processed by the backend; and
         $t_r$ is a think time corresponding to a time between the frontend receiving a response to a request and subsequently transmitting a next request to the backend.

8. A computing system of a computing node, comprising:
   a processor connected to memory; and
   a retry module stored on a non-transitory computer readable medium and configured with instructions that when executed by the processor cause the processor to:
   receive, at a backend of a request processing environment, requests transmitted by frontends over a network to the backend;

control the backend to process the requests to create responses that are transmitted over the network to the frontends that sent the requests;
monitor a load of the backend processing the requests;
in response to the load exceeding a threshold:
  (i) calculate a retry interval as a function of the load; and
  (ii) in response to receiving a subsequent request from a frontend, transmit a command to the frontend, wherein the command modifies operation of the frontend to wait the retry interval before re-transmitting the subsequent request as a retry request;
wherein the request processing environment comprises a multi-tenant environment, and wherein the frontends correspond to tenants having accounts with the multi-tenant environment for executing services by backend computers of the backend;
wherein the instructions comprise instructions that cause the processor to:
determine that a first tenant has a threshold number of connections to the backend more than a second tenant; and
apply a weight to retry intervals calculated for the first tenant and the second tenant so that retry intervals calculated for the first tenant are longer than retry intervals calculated for the second tenant.

9. The computing system of claim 8, wherein the instructions comprise instructions that cause the processor to:
in response to receiving a second subsequent request from the frontend, transmit a second command to the frontend, wherein the second command instructs the frontend to route the second subsequent request to a different destination.

10. The computing system of claim 8, wherein the instructions comprise instructions that cause the processor to:
prior to transmitting the command to the frontend, construct the command to indicate that the subsequent request was not processed.

11. The computing system of claim 8, wherein the instructions to calculate the retry interval comprise instructions that cause the processor to:
calculate the retry interval as a function of:
  i) a number of frontends connected to the backend;
  ii) an average service time for the backend to process the requests;
  iii) a number of backend computers processing the requests;
  iv) a queued time corresponding to an amount of time that requests are queued before being processed by the backend; and
  v) a think time corresponding to a time between the frontend receiving a response to a request and subsequently transmitting a next request to the backend.

12. A computer-implemented method, the computer-implemented method involving a computing node comprising a processor, and the computer-implemented method comprising:
receiving, at a backend of a request processing environment by the processor, requests transmitted by frontends over a network to the backend:
controlling, by the processor, the backend to process the requests to create responses that are transmitted over the network to the frontends that sent the requests;
monitoring, by the processor, a load of the backend processing the requests;
in response to the load exceeding a threshold:
  (i) calculating, by the processor, a retry interval as a function of the load; and
  (ii) in response to receiving a subsequent request from a frontend, transmitting, by the processor, a command to the frontend, wherein the command modifies operation of the frontend to wait the retry interval before re-transmitting the subsequent request as a retry request;
wherein calculating the retry interval as a function of:
  i) a number of frontends connected to the backend;
  ii) an average service time for the backend to process the requests;
  iii) a number of backend computers processing the requests;
  iv) a queued time corresponding to an amount of time that requests are queued before being processed by the backend; and
  v) a think time corresponding to a time between the frontend receiving a response to a request and subsequently transmitting a next request to the backend.

13. The computer-implemented method of claim 12, further comprising:
calculating the retry interval $t_f$ as: $t_f(u*t_s/s)-(t_q+t_s+t_t)$, where:
u is the number of frontends connected to the backend;
$t_s$ is the average service time for the backend to process the requests;
s is the number of backend computers processing the requests;
$t_q$ is the queued time corresponding to an amount of time that requests are queued before being processed by the backend; and
$t_t$ is the think time corresponding to a time between the frontend receiving a response to a request and subsequently transmitting a next request to the backend.

14. The computer-implemented method of claim 12, further comprising:
constructing the command to i) indicate that the subsequent request was not processed and ii) comprise an instruction for the frontend to refrain from creating an error message that the subsequent request was not processed.

15. The computer-implemented method of claim 12, wherein the backend comprises a first backend computer configured to transmit backend requests to a second backend computer according to a cascading configuration, wherein the second backend computer is configured to transmit responses for the requests to the first backend computer.

16. The computer-implemented method of claim 15, further comprising:
monitoring a backend load of the second backend computer processing backend requests from the first backend computer;
in response to the backend load exceeding a backend threshold:
calculating a backend retry interval as a function of the backend load; and
in response to receiving a subsequent backend request from the first backend computer, transmitting a backend command to the first backend computer, wherein the backend command modifies operation of the first backend computer to wait the backend retry interval before re-transmitting the subsequent backend request as a retry backend request.

* * * * *

UNITED STATES PATENT AND TRADEMARK OFFICE
CERTIFICATE OF CORRECTION

PATENT NO. : 10,942,791 B2
APPLICATION NO. : 16/132706
DATED : March 9, 2021
INVENTOR(S) : Ahad Page 1 of 1

It is certified that error appears in the above-identified patent and that said Letters Patent is hereby corrected as shown below:

In the Claims

In Column 20, Line 23, in Claim 13, delete "$t_f(u*t_s/s)$" and insert -- $tf \geq (u*t_s/s)$ --, therefor.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*